United States Patent
Ong et al.

(10) Patent No.: US 11,916,753 B2
(45) Date of Patent: Feb. 27, 2024

(54) GOVERNANCE AND INTERACTIONS OF AUTONOMOUS PIPELINE-STRUCTURED CONTROL APPLICATIONS

(71) Applicant: Ciena Corporation, Hanover, MD (US)

(72) Inventors: Lyndon Y. Ong, Sunnyvale, CA (US); Raghuraman Ranganathan, Bellaire, TX (US); Nigel Davis, Edgware (GB)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/389,775

(22) Filed: Jul. 30, 2021

(65) Prior Publication Data

US 2023/0037140 A1    Feb. 2, 2023

(51) Int. Cl.
*H04L 41/16* (2022.01)

(52) U.S. Cl.
CPC .................... *H04L 41/16* (2013.01)

(58) Field of Classification Search
CPC ...................................... H04L 41/16
USPC ........................................ 709/223
See application file for complete search history.

(56) References Cited

U.S. PATENT DOCUMENTS

| | | |
|---|---|---|
| 6,175,868 B1 | 1/2001 | Lavian et al. |
| 6,223,219 B1 | 4/2001 | Uniacke et al. |
| 6,381,237 B1 | 4/2002 | Lam et al. |
| 6,795,430 B1 | 9/2004 | Ong et al. |
| 6,819,668 B1 | 11/2004 | Hackett et al. |
| 6,922,786 B1 | 7/2005 | Ong |
| 6,990,124 B1 | 1/2006 | Dalias et al. |
| 6,990,517 B1 | 1/2006 | Bevan et al. |
| 7,400,583 B2 | 7/2008 | Friskney et al. |
| 7,962,619 B2 | 6/2011 | Gazier et al. |
| 8,009,681 B2 | 8/2011 | Ong et al. |
| 8,045,481 B2 | 10/2011 | Ong et al. |
| 8,127,042 B1 | 2/2012 | Davis et al. |
| 8,184,526 B2 | 5/2012 | Duncan et al. |
| 8,300,625 B2 | 10/2012 | Shew et al. |
| 8,355,333 B2 | 1/2013 | Gazier et al. |
| 8,432,909 B2 | 4/2013 | Ong et al. |
| 8,433,192 B2 | 4/2013 | Frankel et al. |
| 8,467,290 B2 | 6/2013 | Gazier et al. |
| 8,531,969 B2 | 9/2013 | Ong |
| 8,724,505 B2 | 5/2014 | Ong |
| 8,787,170 B2 | 7/2014 | Ong et al. |
| 8,788,709 B1 | 7/2014 | Ong |
| 8,818,198 B2 | 8/2014 | Trnkus et al. |
| 9,071,532 B2 | 6/2015 | Oltman et al. |
| 9,509,728 B2 | 11/2016 | Ong |
| 10,015,115 B2 | 7/2018 | Ranganathan et al. |
| 10,033,623 B2 | 7/2018 | Jain et al. |

(Continued)

*Primary Examiner* — Adnan M Mirza
(74) *Attorney, Agent, or Firm* — Baratta Law PLLC; Lawrence A. Baratta, Jr.

(57) ABSTRACT

Systems and methods include receiving information from a governed system having resources; implementing one or more context neutral or specific control applications that each is a pipeline of a plurality of functions to control the resources; utilizing the information as one input to a first function in the plurality of functions; utilizing inputs from one or more control applications as inputs to any of the plurality of functions; and causing actions on the resources based on outputs of a last function in the plurality of functions. The plurality of functions can include sensing, discerning, inferring, deciding, and causing the actions.

20 Claims, 10 Drawing Sheets

(56) References Cited

U.S. PATENT DOCUMENTS

| | | |
|---|---|---|
| 10,057,135 B2 | 8/2018 | Shew et al. |
| 10,153,948 B2 | 12/2018 | Ong |
| 10,404,365 B2 | 9/2019 | Frankel et al. |
| 10,541,877 B2 | 1/2020 | Bainbridge et al. |
| 2003/0188228 A1 | 10/2003 | Davis et al. |
| 2005/0152284 A1 | 7/2005 | Kotha et al. |
| 2007/0201383 A1 | 8/2007 | Ong et al. |
| 2008/0084826 A1 | 4/2008 | Ong |
| 2016/0210631 A1 | 7/2016 | Ramasubramanian et al. |
| 2017/0126792 A1* | 5/2017 | Halpern .............. H04L 41/0894 |
| 2018/0241843 A1* | 8/2018 | Bardhan ................ G06N 3/084 |
| 2018/0359133 A1 | 12/2018 | Shew et al. |
| 2019/0132219 A1* | 5/2019 | Gandhi ............... H04L 41/5003 |
| 2020/0259717 A1* | 8/2020 | Ong ....................... G06N 20/00 |
| 2020/0336376 A1 | 10/2020 | Mahdi et al. |

\* cited by examiner

GOVERNANCE AND INTERACTIONS OF AUTONOMOUS PIPELINE-STRUCTURED CONTROL APPLICATIONS

CROSS-REFERENCE TO RELATED APPLICATION(S)

The present disclosure relates to U.S. patent application Ser. No. 16/270,667, filed Feb. 8, 2019, and entitled "Safeguarding Artificial Intelligence-based network control," and U.S. patent application Ser. No. 16/849,129, filed Apr. 15, 2020, and entitled "Self-optimizing fabric architecture and self-assembling network," the contents of both are incorporated by reference in their entirety.

FIELD OF THE DISCLOSURE

The present disclosure generally relates to autonomous networking. More particularly, the present disclosure relates to systems and methods for governance and interactions of autonomous pipeline-structured control applications.

BACKGROUND OF THE DISCLOSURE

Most industry descriptions for analytics and closed loop behavior in networks are based on the OODA (observe-orient-decide-act) loop concept. ETSI work on Zero Touch network and service management (ZSM) has used this OODA loop concept to define interfaces to the functions. However, there are no efforts on governance of one or more pipelines such as for analytics and closed loop behavior and the possible context specific interactions of the pipelines. The industry work does not consider branching and intertwining as well as the fractal nature. 3GPP's Self-Organizing Network (SON) has analytics with control loop to configure the Radio Access Network (RAN). However, this does not include governance and context specific interactions of the pipelines.

Loosely and/or tightly coupled control systems are concepts in systems engineering. Governance of control systems may also be typically discussed in the context of static system configuration. For example, a Network Management System (NMS) configuring an analytics platform for analysis of network state.

U.S. patent application Ser. No. 16/849,129 describes the East-West, North-South and recursive interconnection of SDIDA (Sense, Discern, Infer, Decide and Act) systems in general broad terms. A static SDIDA pipeline may not be sufficient in situations such as with dynamic changes in traffic of a packet transport network or any dynamic system. For example, when a Denial-of-Service (DoS) attack is occurring, the existing SDIDA's infer engine might provide a lower recall (i.e., percentage correctly classified).

BRIEF SUMMARY OF THE DISCLOSURE

The present disclosure relates to systems and methods for governance and interactions of autonomous pipeline-structured control applications. Again, U.S. patent application Ser. No. 16/849,129 describes the East-West, North-South and recursive interconnection of SDIDA systems in general broad terms. The present disclosure defines specific approaches of interconnecting the Sense, Discern, Infer, Decide and Act components of an SDIDA system with other systems. This is for purposes of providing, for example, enrichment data to a peer system's SDIDA pipeline or governance of an SDIDA system through specific inputs into its S, D, I, D and A components. Along with a governance model, a governing interface, for the control application pipeline as a whole and/or for the specific components of the control application pipeline, is identified to control the changes required in a pipeline with the governance aspects enumerated in detail. The present disclosure identifies the use of multiple SDIDA pipelines that could be context specific and the possible interactions between them. The option to branch off a function to other pipelines as well as merge with an existing pipeline is also presented and thus is a specific arrangement of the intertwining that is deemed critical. Additionally, there can be a shared SENSE for a mesh of pipelines.

In various embodiments, the present disclosure includes a method including steps, a processing device configured to implement the steps, and a non-transitory computer-readable medium having instructions for the steps. The steps include receiving information from a governed system having resources; implementing one or more context neutral or specific control applications that each is a pipeline of a plurality of functions to control the resources and with specified interfaces to other control applications; utilizing the information as one input to a first function in the plurality of functions; utilizing inputs from one or more control applications as inputs to any of the plurality of functions; and causing actions on the resources based on outputs of a last function in the plurality of functions.

The plurality of functions can include sensing, discerning, inferring, deciding, and causing the actions. The steps can include dynamically modifying what information is used as the one input to the sensing. The steps can include dynamically modifying weights on inputs between any of the plurality of functions for the discerning. The steps can include dynamically selecting one or more infer engines of a plurality of infer engines. The steps can include sharing the sensing with the one or more control applications. The steps can include utilizing an output of any of the plurality of functions as an input into another control application. The governed system can be a network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
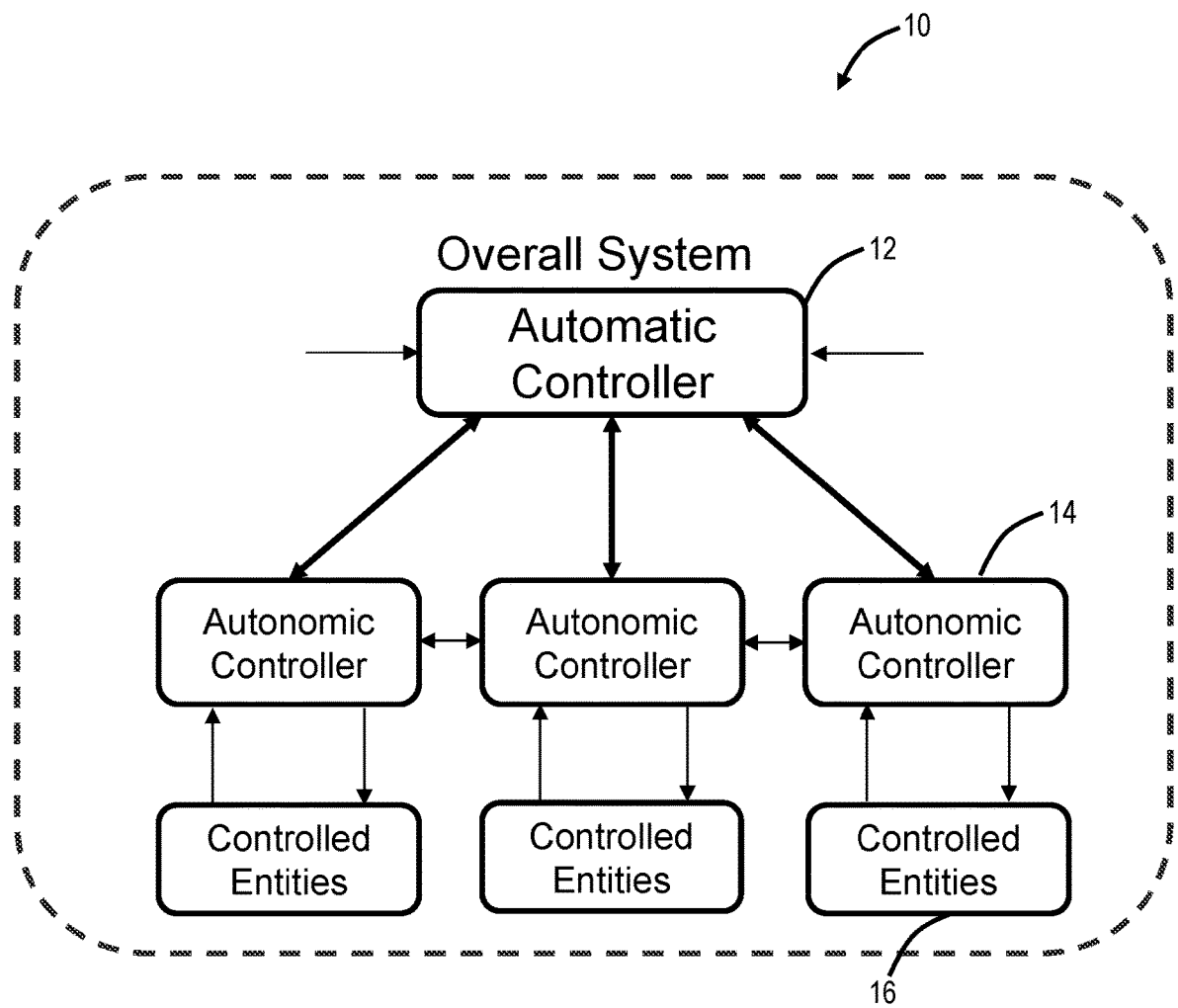
FIG. 1 is a block diagram of a control system for use with the systems and methods described herein.

The present disclosure relates to systems and methods for governance and interactions of autonomous pipeline-structured control applications. Again, U.S. patent application Ser. No. 16/849,129 describes the East-West, North-South and recursive interconnection of SDIDA systems in general broad terms. The present disclosure defines specific approaches of interconnecting the Sense, Discern, Infer, Decide and Act components of an SDIDA system with other systems. This is for purposes of providing, for example, enrichment data to a peer system's SDIDA pipeline or governance of an SDIDA system through specific inputs into its S, D, I, D and A components. Along with a governance model, a governing interface is identified to control the changes required in a pipeline with the governance aspects enumerated in detail. The present disclosure identifies the use of multiple SDIDA pipelines that could be context specific and the possible interactions between them. The option to branch off a function to other pipelines as well as merge with an existing pipeline is also presented and thus is a specific arrangement of the intertwining that is deemed critical. Additionally, there can be a shared SENSE for a mesh of pipelines.

Definitions

Controller—a processing device that implements the intelligence providing a pattern of Sense, Discern, Infer, Decide, and Act (SDIDA). Each controller is associated with (i.e., contained in, connected to, etc.) a domain. The controller can communicate with devices via various techniques, including open APIs, shared information models, as well as proprietary techniques. Devices can include, without limitation, network elements, other controllers, client devices, user equipment, etc. That is, devices can be anything that is controllable for providing resources. A controller has one or more of sense and act functionality over a set of resources, and works together with other controllers for creating compositions of resources that expand beyond the domain. The SDIDA pattern can be implemented in different ways, like separate modules for each or combining, e.g., Discern/Infer/Decide in a single module, but still providing the same pipeline.

Domain—any device, network, cloud, multiple devices, etc. that provide resources such as connect (networking) resources, storage resources, and compute resources. Ultimately, the resources are used to provide a service to end-users, machines, etc. A domain can be a fluid construct, in addition to a static construct. For example, a domain may include a data center, a cloud, a network, or even a single device or network element.

Federation—an interconnection of multiple controllers and/or multiple control application pipelines in any of a peer relationship (East-West (E-W)) and a hierarchical relationship (North-South (N-S)), where the multiple controllers work together, each with their intelligence, to meet some intent or goal such as in terms of services.

Provider—an entity that provides any valuable service, to their customers' client systems, with any resources, as the network evolves as described herein, a provider can be in any of the different categories (telco, cloud, and IoT).

Resources—compute, storage, sensing, and/or networking resources.

Services—broadly—anything that is provided via the resources. Non-limiting examples of services include voice, video, live streaming, telemetry, analytics, connecting devices, Ethernet/IP packet and wavelength connectivity, Radio Access Network (RAN) or mobile services, etc. It is expected that service offerings will continue to expand, and all such expansions are contemplated herein.

SOF—the SOF is a term utilized to denote a fabric operating autonomously with one or more controllers in a federation to provide the services. A SOF operates with a fluid formation of controllers with interacting control application pipelines.

Reference System

FIG. 1 is a block diagram of a control system 10 for use with the systems and methods described herein. The control system 10 includes an autonomic controller 12 that connects to various autonomic controllers 14 in a hierarchy (but can be just peers) which in turn connect and control controlled entities 16. FIG. 1 is a logical representation and the controller function could be embedded or separate. The controllers 12, 14 are processing devices with specialized and/or general processors and memory storing instructions that, when executed, cause the processors to perform various steps as described herein. The controlled entities 16 are the underlying resources under control. In an embodiment, the controlled entities 16 are network elements in a network, e.g., switches, routers, packet-optical transport, Wavelength Division Multiplexing (WDM) terminals, Reconfigurable Optical Add/Drop Multiplexers (ROADMs), servers, etc. Of course, the controlled entities 16 can be other types of resources. Collectively, the controllers 12, 14 each implement one or more context specific control application pipelines to control the administrative or operational state of the controlled entities 16.

The following three aspects are described: (a) analytics pipeline(s) as a control application that is used to govern a system or systems, (b) interacting analytics pipelines that can be nested or hierarchy or peers, and (c) governing—self or by other—of the analytics pipeline(s).

(a) Analytic Pipelines as a Control Application

Figure 2:
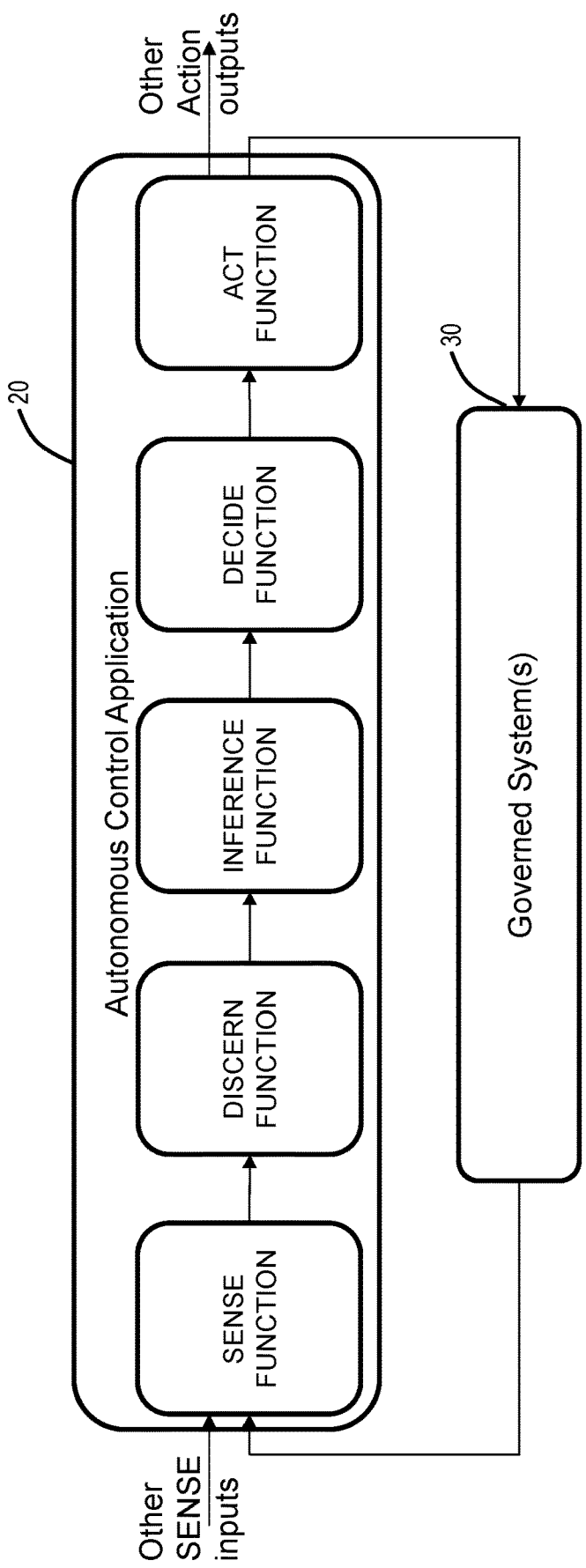
FIG. 2 is a diagram of a control application with a SDIDA pipeline for providing control of governed systems.

FIG. 2 is a diagram of a control application 20 with a SDIDA pipeline for providing control of governed systems 30. The control application 20 can be implemented through the controllers 12, 14, and the governed systems 30 can include the controlled entities 16. The present disclosure assumes the control application 20 for analytics as a pipeline of functions including Sense, Discern, Infer, Decide and Act (SDIDA) functional components with link(s) between these components for transfer of information between these components. Additional link(s) (not shown in FIG. 2) could be used to influence, e.g., with weights, the information that is used by a component. The output of a given SDIDA pipeline would then be used to govern the actions of some or all aspects of a controlled system or systems 30.

Such control applications can be referred to as an Autonomous Controller albeit components of the applications could be implemented in different hosts or systems with separate operational implications.

Each of the SDIDA functions in the pipeline is described as follows:

Each function in the pipeline can receive one or more vectors as inputs, i.e., a list $[x_1, x_2, x_3 \ldots x_j]$, for example, and provide one or more vectors as outputs, i.e., a list $[y_1, y_2, \ldots y_k]$, for example. In general, for a pipeline, some or all the inputs to the pipeline can come from the Governed System 30, or from a peer distributed control application 20, or a higher-level distributed control application or an outside source. The data along with any additional metadata may be asynchronous and also indicate some inter-relationship for further processing by the pipeline.

The SENSE function is to detect the current configuration or operational or other necessary information by capturing the data relevant for the pipeline and may include pre-processing to a suitable format for further processing by the pipeline. For example, in a packet transport network, this function could collect the 5-tuple of packet header information for packet flows or reading the counter values for the packets in a packet flow that are declared green or yellow or red by a policer in a network element or the billing information for a particular customer's packet traffic in the network.

The DISCERN function is to identify a pattern in current state. For example, in a packet transport network, this function could identify the presence or absence of a particular unique signature either in the packet header and/or in the payload in a specific packet flow during specific periods in time. The DISCERN function can be rule-based, via heuristics, via machine learning, as well as combinations thereof.

The INFER functions are to conclude, for example, on the type of pattern in current state. For example, in a packet transport network, this function could determine whether some unique signature in the packet flow from a given source address corresponds to an anomaly. The Autonomic Controller could be but is not limited to using Artificial Intelligence (AI)/Machine Learning ML models in which case the INFER Function could use Supervised, Unsupervised or Reinforcement Learning Methods.

The DECIDE function is to determine the target state. For example, in a packet transport network, this function could determine that the packet flow needs a new Access Control List (ACL) entry to filter the flow in the network element where the packet flow enters the network. As part of the DECIDE Function there may be constraints introduced on the actions that can be taken based on system conditions.

The ACT function is to change the configuration and/or operational state of entities with the pipeline providing some actions $[a_1, a_2, \ldots a_n]$ to be taken on the Governed System(s) 30. For example, in a packet transport network, this function could apply the ACL entry in a set of ports of a specific network element where the anomalous traffic is to be filtered by the network.

In general $j \neq k \neq n$ for the vectors discussed above.

(b) Interacting Pipelines

This present disclosure identifies possible ways the pipelines, in same or different control applications, can interact.

There can be one or more autonomous control applications 20, and, thus, SDIDA pipelines, for control of the Governed System(s) 30. A particular control application 20 may also have one or more SDIDA pipelines for different contexts of a Governed System 30. This can be, for example, per functional behavior in the Governed System(s) 30 such as a Network Slice or a resource within a Network Slice such as a specific protocol like Border Gateway Protocol (BGP) or Operations, Administration and Management (OAM) function like fault or performance management, or a combination of resources in each service instance such as a Virtual Private Network (VPN) or Virtual Private Cloud (VPC).

Figure 3:
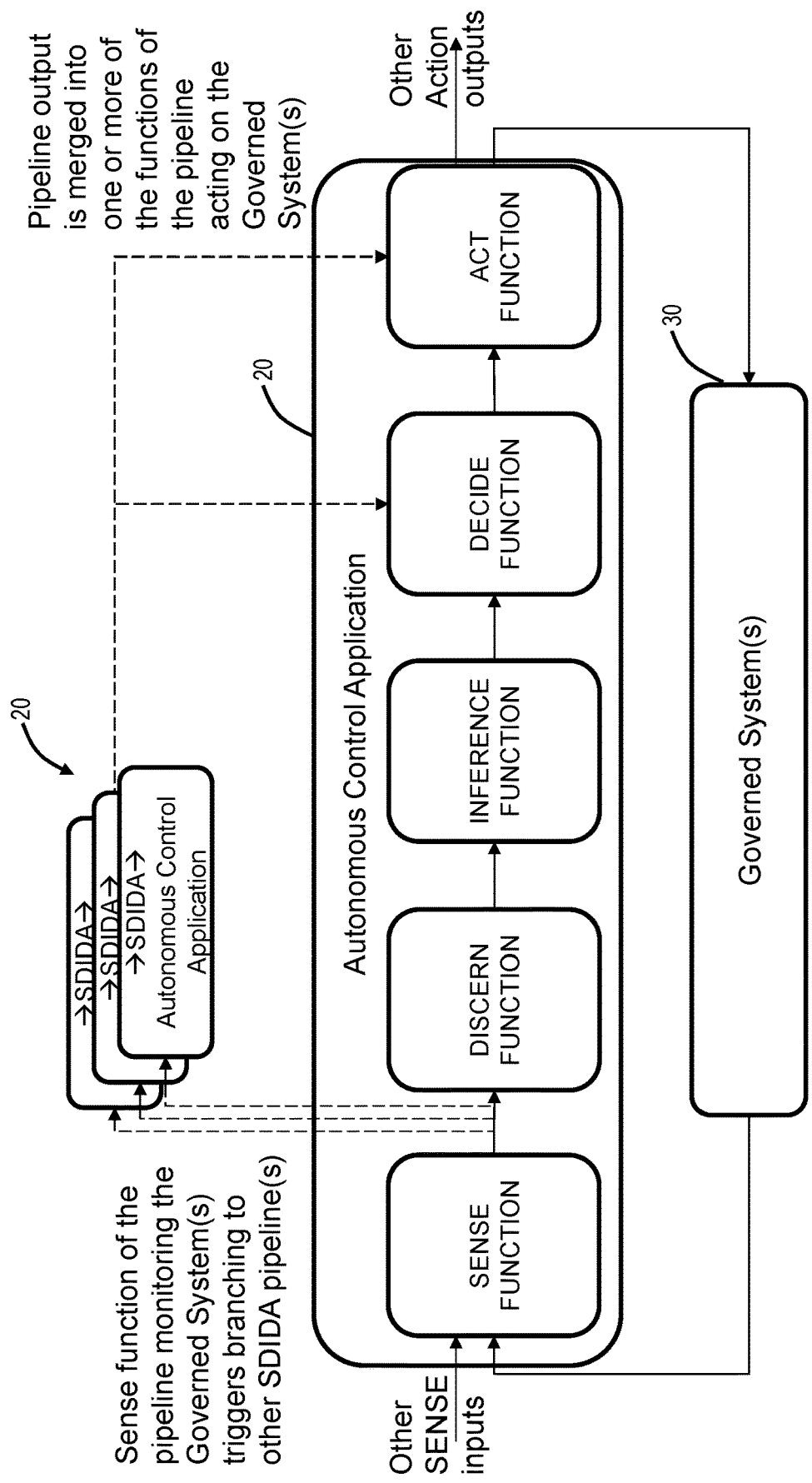
FIGS. 3 and 4 are block diagrams of a SENSE function in one pipeline triggering a use of additional SDIDA pipelines in other control applications.

The inputs indicating some state information, such as configured and/or operational, of the Governed System(s) 30 or other entities could be parsed to different SENSE functions of different pipelines. On the other hand, any function in a SDIDA pipeline may trigger other pipelines as branch(es) in same or other control application depending on one or more criteria such as packet flow data or metadata. For example, FIG. 3 is a block diagram of a SENSE function in one pipeline triggering a use of additional SDIDA pipelines in other control applications 20 based on some criteria about the data and/or metadata for the current operational state of a given Network Slice or a given packet flow in the case of a packet network. The output(s) can then be merged to any of the functions in the SDIDA pipeline that originally triggered the branching.

Figure 4:
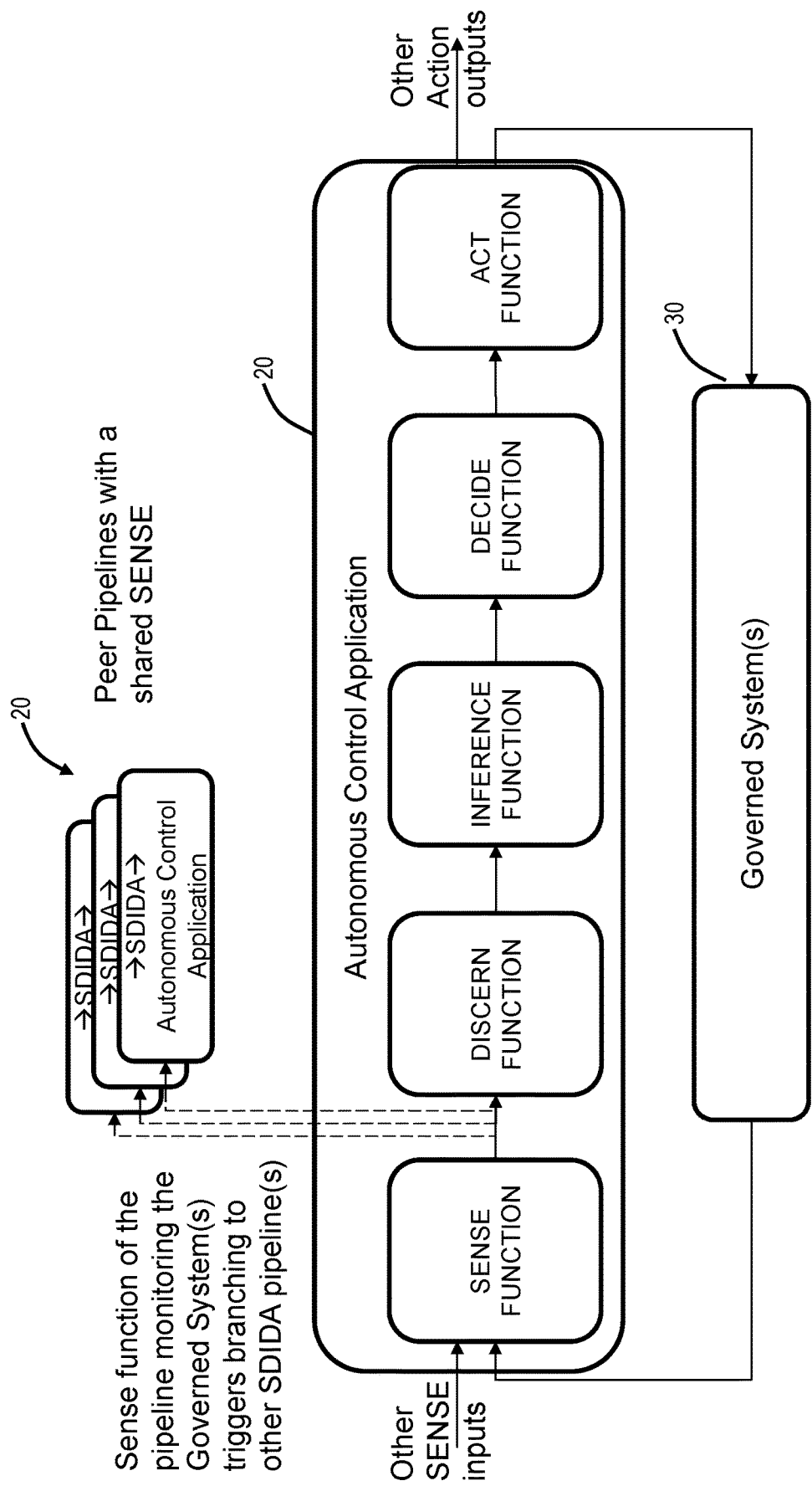

Alternatively, the outputs can be inputs to other SDIDA pipelines that are peers for governing other Governed System(s) 30 and thus not merge back in as shown in FIG. 4.

From a deployment perspective, the autonomous control applications 20 could be embedded as a component of Network Operating System (NOS) of the Governed System(s) 30 or as part of an external system such as an analytics or management system. Additionally, in a cloud-native implementation, the control applications 20 could be microservices interconnected via a service mesh which allows the control applications 20 to publish their capabilities and to subscribe to the capabilities of other control applications 1.

The Autonomous Controller instance might include a catalog of pipelines for the control applications along with possible and/or allowed (or trained in case of AI/ML) interactions between the pipelines. Such pipelines could be instantiated with zero-touch provisioning (ZTP) with use of workflow engines, for example, to meet service intent such as in a given Network Slice. Additionally, a catalog of active and available pipelines could be exposed (via APIs) to peers as well as other entities that govern the Autonomous Controller.

(c) Governing the Pipeline(s)

The present disclosure identifies a governance approach to track and update the behavior of the entire pipeline or a specific function, e.g., INFER Function, or multiple functions of the pipeline that controls the Governed System(s) 30.

Just as with any control solution, Governance operation takes place over widely varying timescales, however, it is normal that the control solution elements being governed will be operating in shorter timescales than the governance as governance needs to gain sufficient information on the governed system operation to be able to take relevant action. Interactions could be with short timescales, e.g., update within one or two round-trip times for a packet flow, to achieve specific adaptive behaviors of the control applications themselves as well as the Governed System(s) 30.

Note, for illustration purposes and ease of understanding and to keep the description simple, the term 'Governed System' is referring to the resources in system(s) albeit the control application could also be considered a 'Governed system' from the perspective of a peer control application.

Figure 5:
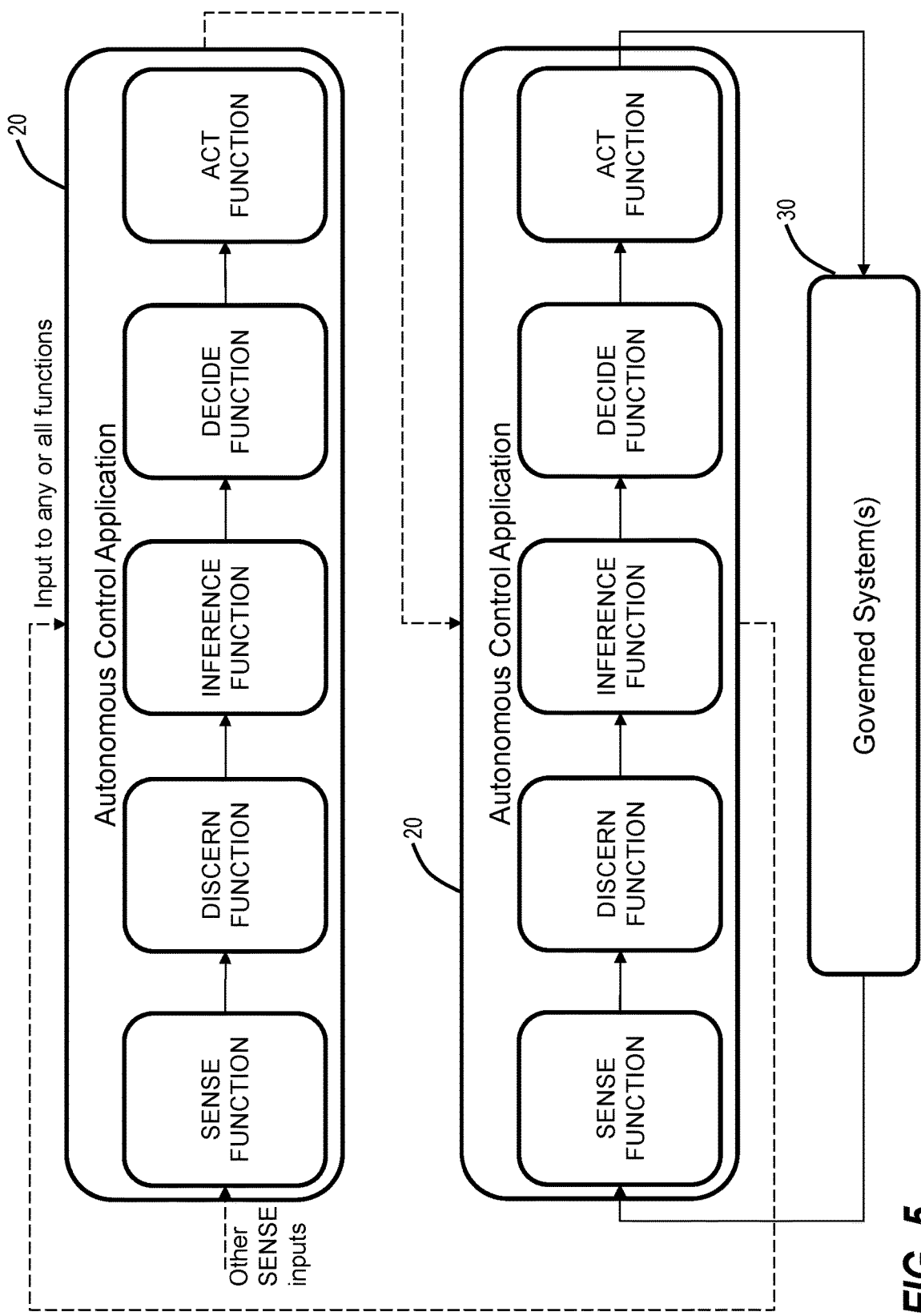
FIG. 5 is a block diagram of a governing control system.

In one approach, one control application's SDIDA pipeline can be used to govern another SDIDA pipeline, which includes instantiation of pipeline, using access to a broader range of information about the behavior of the overall environment as well as possibly external enrichment information that is useful for control purposes, as shown in FIG. 5 which is a block diagram of a governing control system. There can be a parent-child relationship constraint such that the interface messages from parent to child is for a governing interface, i.e., with attributes enabling changes to a function, for example, while the interface messages from child to parent is for a non-governing interface, i.e., with attributes for values to be used by a function, for example. The input from child to parent would be in addition to other inputs that are relevant for a SDIDA pipeline, e.g., data for SENSE Function or weights for INFER Function.

Figure 6:
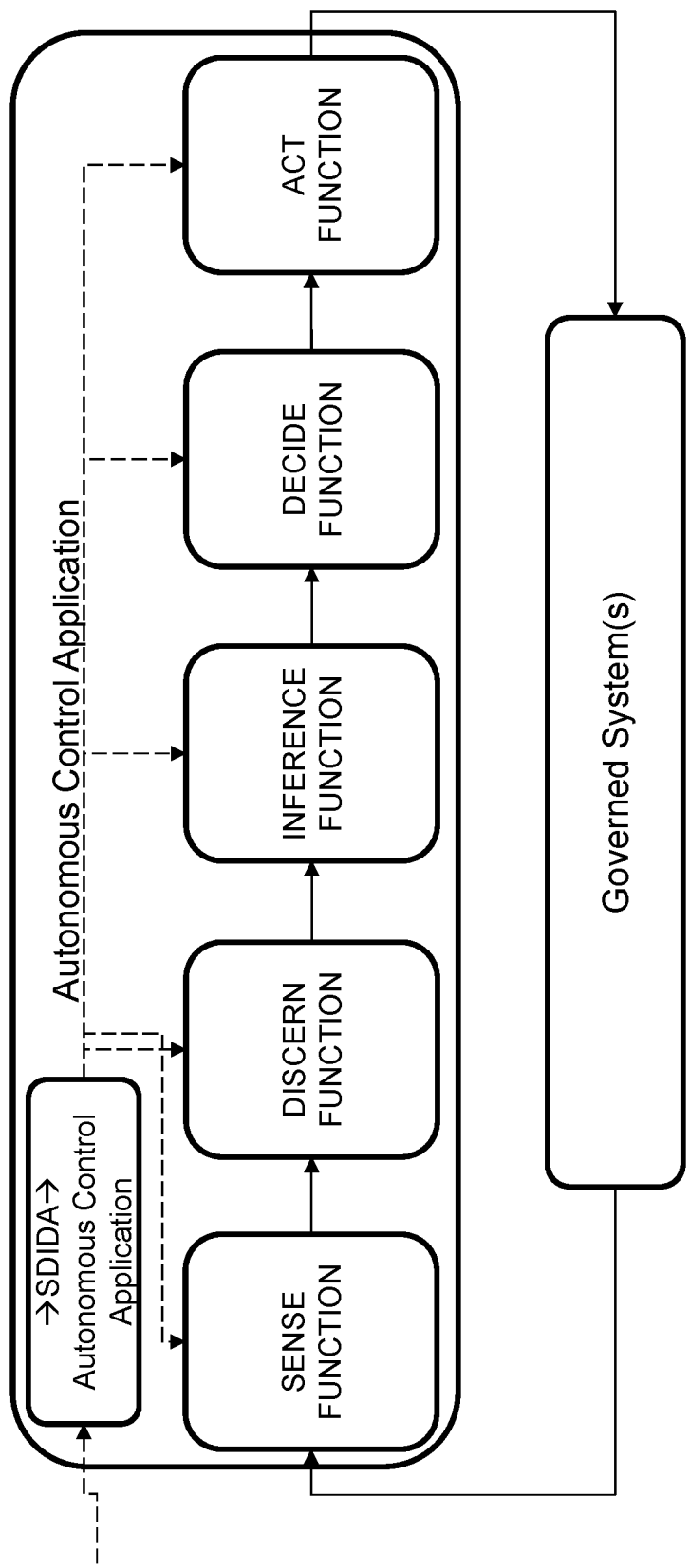
FIG. 6 is a block diagram of a local controller.

Such a governing control system's SDIDA pipeline could also be embedded within a given autonomous control application as shown in FIG. 6, which is a local governance control system, such as using microservices in a cloud native control application with a service mesh.

Hierarchical, Local, and Recursive Control

Figure 7:
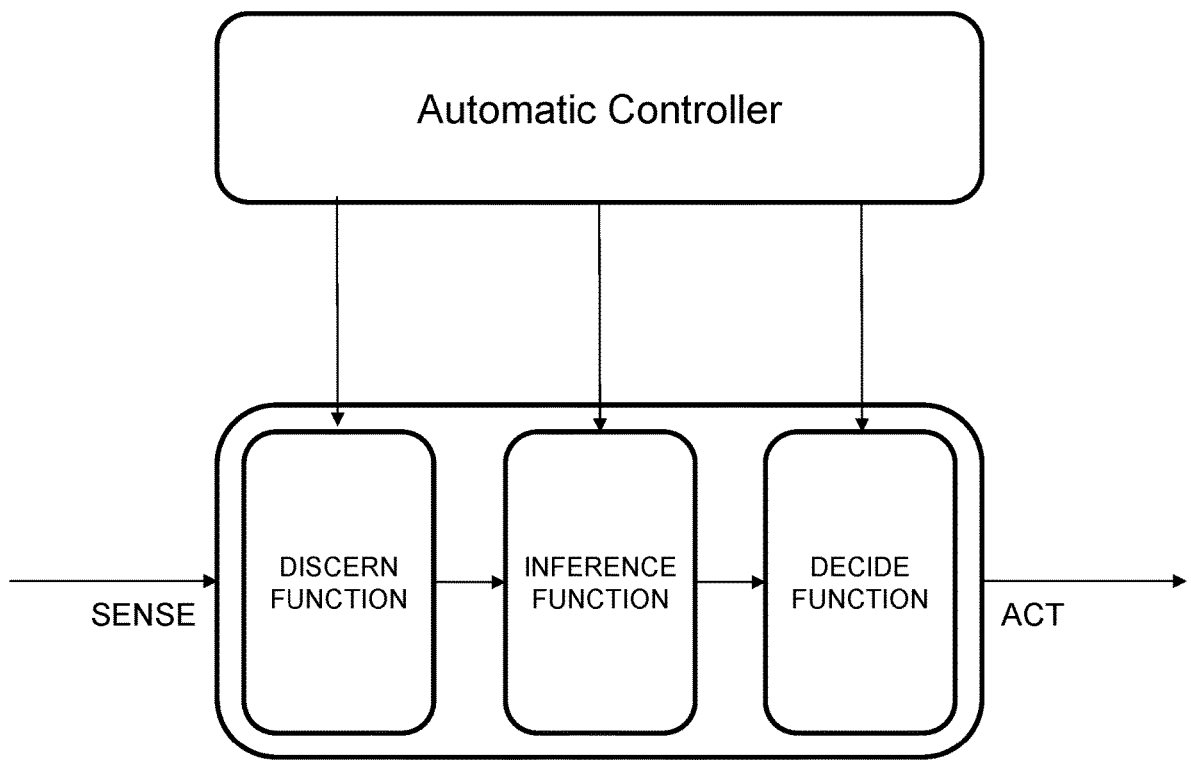
FIG. 7 is a block diagram of an automatic controller.
Figure 8:
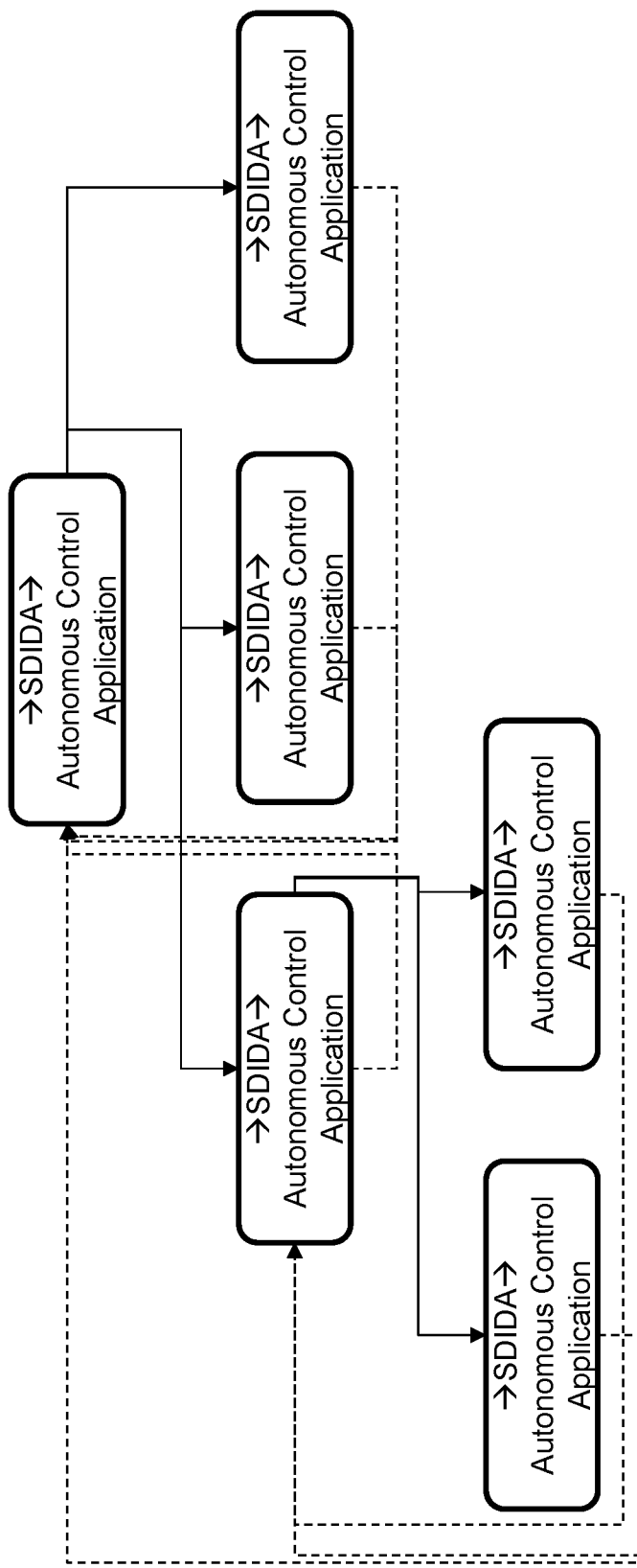
FIG. 8 is a block diagram of recursion of governance.
Figure 9:
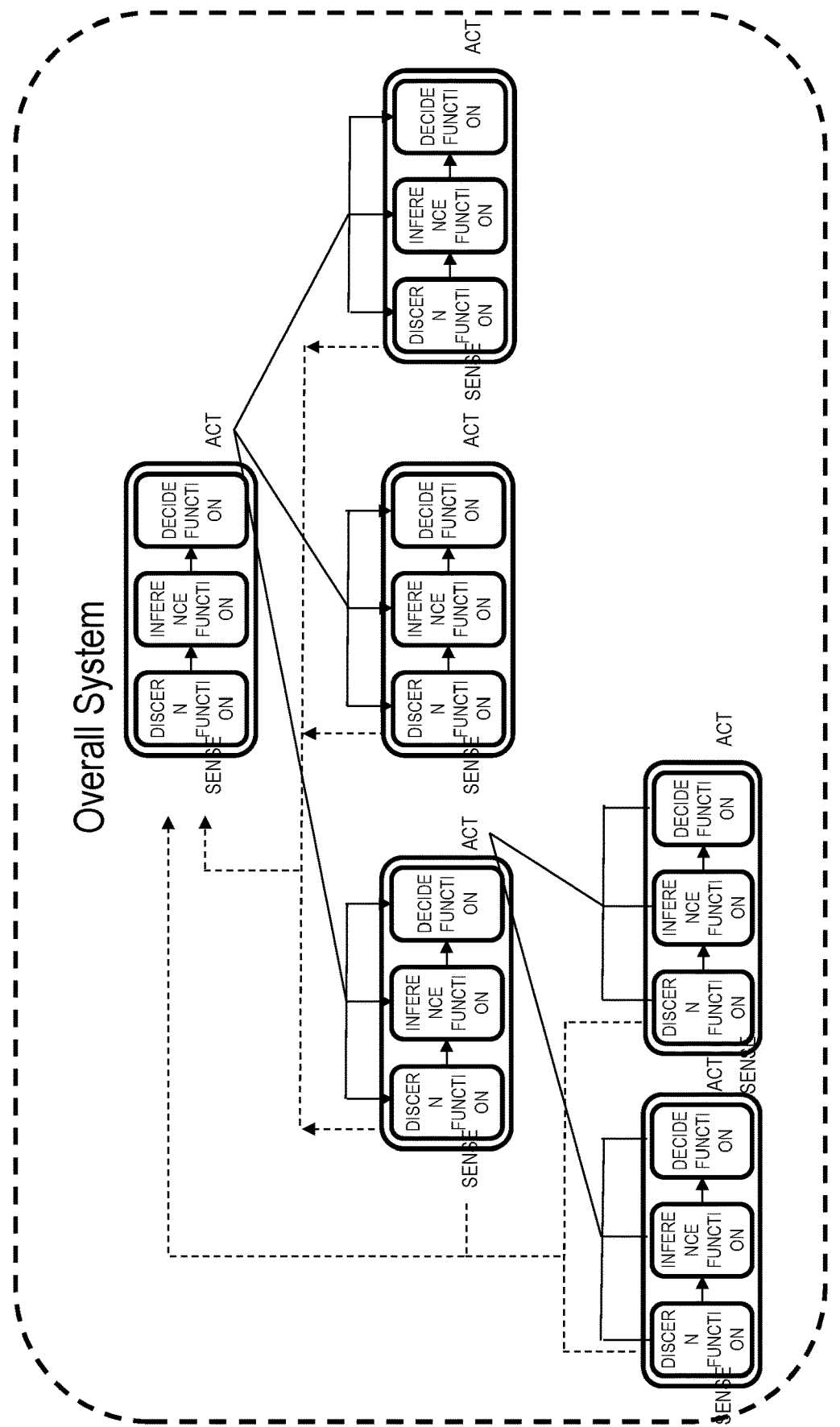
FIG. 9 is a block diagram of recursive control of control.

FIG. 6 is a block diagram of a local controller. FIG. 7 is a block diagram of an automatic controller. FIG. 8 is a block diagram of recursion of governance. FIG. 9 is a block diagram of recursive control of control.

Autonomous control applications can be assembled into recursive layers with multiple levels of governance as shown in FIG. 8. While FIG. 8 shows an abstracted hierarchy, an implementation could have some or all control applications in the same system such as a multi-domain service orchestrator where the control applications are for specific but inter-dependent contexts of a multi-domain service. The input from a lower level to a higher-level control application could be from any function in the SDIDA pipeline but is not for governance purposes.

Governance Control the DISCERN function can include measurements or events received from the system under control may need translation or modification before being accepted by the infer engine. This translation or modification can be done by the DISCERN function. The format of measurements or events may need translation before they are suitable for input to the INFER engine. One control may be to update or change the translation function for improved results. Some inputs may be more dynamic and need heavier weighting. These inputs can be dynamically allocated higher weights before forwarding to the infer engine. To remove noise or distraction, some inputs may be identified as being less reliable or even subject to tampering. These inputs can be dynamically blocked from the INFER function.

the INFER function can include taking some number of inputs and draws inferences which are presented as some number of outputs. The outputs are used to represent inferred system state and projected change. To select an infer engine, in some cases the INFER function may include multiple infer engines either existing as alternatives or in some combination to produce the results. The control interface can be used to dynamically select among multiple infer engines or modify the combination of multiple infer. To update the infer engine, the operating infer engine itself (or engines) may be dynamically updated based on improvements in model or training. Once the update has been developed the control interface can support updating of the current engine. This potentially includes complete replacement of the infer engine.

For Reinforcement Learning infer engines, in the case of engines using reinforcement learning, the engine itself has evolved over time. It is still possible to replace or reset the engine in real time (reset the current state). Alternatively, updates can be made to the reward function and the engine allowed to continue to evolve but with a different reward function or the reward function itself could include feedback from the hierarchical controller.

the DECIDE function takes input from the infer function and translates this into actions on the system. This translation may be subject to constraints on allowed actions. The DECIDE Function may be updated in real time so that the translation from INFER Function results to actions is changed. The DECIDE Function may be updated in real time to increase or reduce the range of actions that are possible (this implies also change of the translation). The DECIDE Function can be dynamically updated to apply a new set of constraints, for example, introducing rules based on combinations of potential actions that are allowed or not allowed. These constraints may be applied over a defined period of time or permanently applied.

Governance

Governance can be exerted through outputs of the [DID] piece from the SDIDA pipeline that is designated as the governance function for another pipeline:

The governance function may modify the SENSE function of another pipeline, for example:
  Dynamically modifying the vector that is used for a given context by removing or adding inputs that are considered noise or distraction.
  Dynamically include or remove branch points
The governance function may modify the DISCERN function of another pipeline, for example:
  Dynamically modifying the weights assigned to different inputs. For example, some inputs may be changing more rapidly and be assigned heavier weighting for the infe function.
  Removing inputs that are considered noise or distraction. Some inputs may be identified as being less reliable or the subject of tampering to interfere with operation. These inputs can be dynamically blocked from the infer function.
  Dynamically include or remove branch points
The governance function may modify the INFER function of another pipeline, for example:
  Select among multiple infer engines
    In some cases, the infer function may consist of multiple infer engines either existing as alternatives or in some combination to produce the results.
    The governance interface can be used to dynamically select among multiple infer engines or modify the combination of multiple infer engines.
    Such selection could be used for NB testing before finalizing on a specific infer engine.
  Update a specific infer engine
    The operating infer engine itself (or engines) may be dynamically updated based on improvements in model or training.
    Once the update has been developed the governance interface can support updating of the current engine.
    This potentially includes complete replacement of the infer engine.
  Reinforcement Learning infer engines
    In the case of engines using reinforcement learning, the engine itself evolves over time based on system state and a predefined reward function.
    The governance interface can be used to replace or reset the infer engine in real time (reset the current state).
    Alternatively, updates can be made to the reward function and the engine allowed to continue to evolve but with a different reward function.
    Alternatively input from the governance controller can be introduced directly as part of the system state, in order to affect the actions of the infer engine.
The governance function may modify the DECIDE function of another pipeline, for example:
  Update Decide Function
    The Decide Function may be updated in real time so that the translation from infer Function results to actions is changed.
    The Decide Function may be updated in real time to increase or reduce the range of actions that are possible (this implies also change of the translation).
  Update constraints
    The Decide Function can be dynamically updated to apply a new set of constraints, for example, introducing rules based on combinations of potential actions that are allowed or not allowed.

These constraints may be applied over a defined period of time or permanently applied.

The governance function may modify the ACT function of another pipeline, for example:

Dynamically update the possible set of actions.

Change the vector of outputs that are relevant for a given action

The interface used for governance from a higher-level application to a lower-level application may support API functionality such as CREATE, READ, UPDATE, DELETE and LIST based on a model of the lower level application that is known by the higher level application that describes the objects that can be managed in the lower level application.

Process

Figure 10:
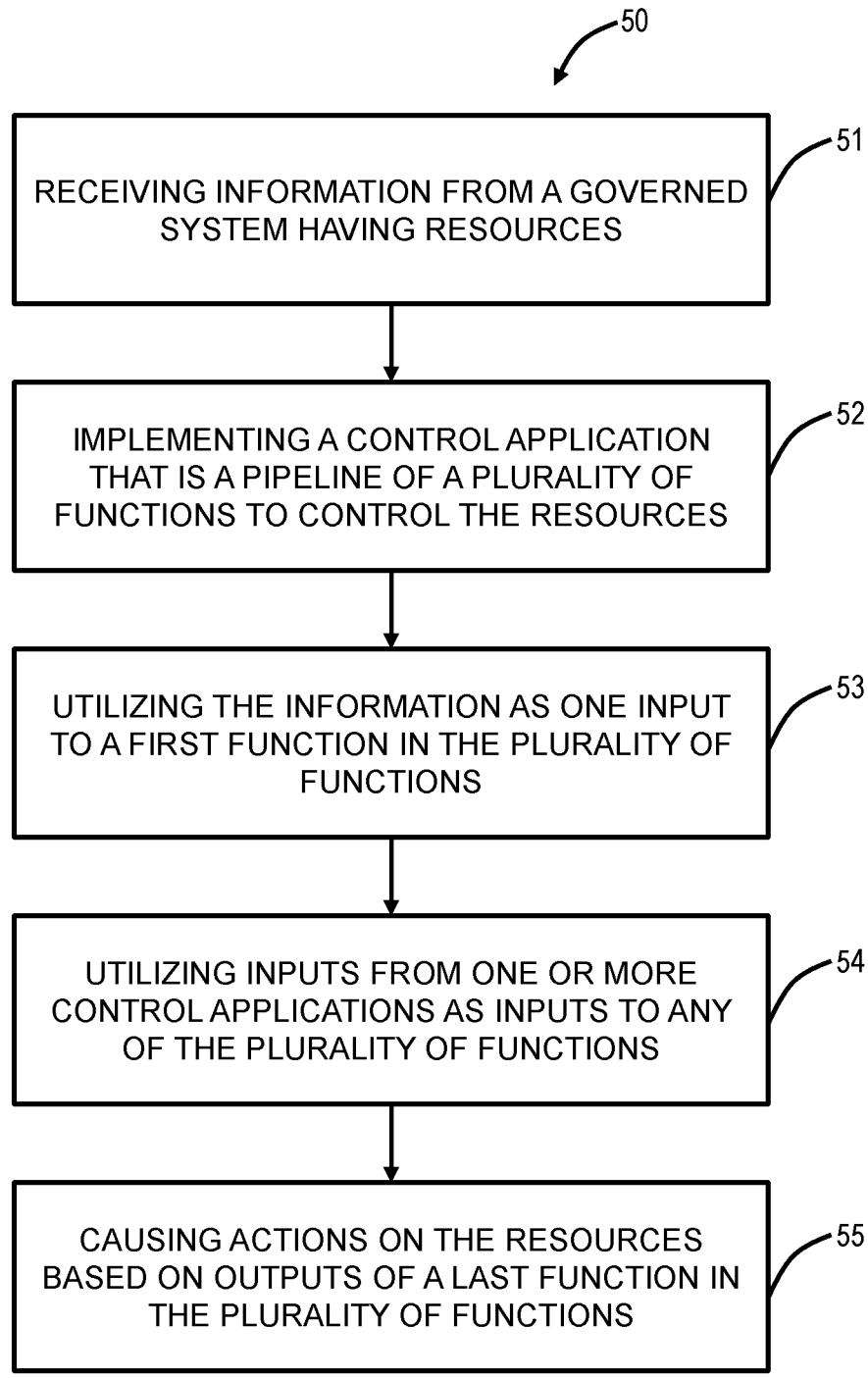
FIG. 10 is a flowchart of a process for governance and interactions of autonomous pipeline-structured control applications.

FIG. 10 is a flowchart of a process 50 for governance and interactions of autonomous pipeline-structured control applications. The process 50 can be implemented as a computer-implemented method, via a processing device, and as instructions embodied in a non-transitory computer-readable medium.

The process 50 includes receiving information from a governed system having resources (step 51); implementing one or more control applications with each as a composable pipeline of a plurality of functions to control the resources and the specific interactions between the pipelines for the specific context (step 52); utilizing the information as one input to a first function in the plurality of functions (step 53); utilizing inputs from one or more control applications as inputs to any of the plurality of functions (step 54); and causing actions on the resources and/or other control applications based on outputs of a last function in the plurality of functions (step 55).

The plurality of functions include sensing, discerning, inferring, deciding, and causing the actions. The process 50 can include dynamically modifying what information is used as the one input to the sensing. The process 50 can include dynamically modifying weights on inputs between any of the plurality of functions for the discerning. The process 50 can include dynamically selecting one or more infer engines of a plurality of infer engines. The process 50 can include sharing the sensing with the one or more control applications. The process 50 can include utilizing an output of any of the plurality of functions as an input into another control application.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), Tensor Processing Units (TPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming a device for performing steps of:

receiving information from a governed system having resources, wherein the governed system is a network;

implementing a plurality of context specific control applications that each is a pipeline of a plurality of functions to control the resources and with specified interfaces to other context specific control applications, wherein each context specific control application of the plurality of context specific control applications is configured to control functional behavior of a corresponding aspect of the network, wherein a context specific control application of the plurality of context specific control applications controls one of functional behavior of (i) a network slice, (ii) a specific protocol, (iii) an Operations, Administration, and Management (OAM) function, and (iv) resources associated with the network slice, wherein the plurality of functions include sensing, discerning, inferring, deciding, and causing the actions;

utilizing the information as one input to a first function in the plurality of functions of a context specific control application;

utilizing inputs from another one or more of the plurality of context specific control applications as inputs to any of the plurality of functions of the context specific control application;

causing actions on the resources based on outputs of a last function in the plurality of functions of the context specific control application; and
dynamically modifying what information is used as the one input to the sensing.

2. The non-transitory computer-readable medium of claim 1, wherein the steps further include
dynamically modifying weights on inputs between any of the plurality of functions for the discerning.

3. The non-transitory computer-readable medium of claim 1, wherein the steps further include
dynamically selecting one or more infer engines of a plurality of infer engines.

4. The non-transitory computer-readable medium of claim 1, wherein the steps further include
sharing the sensing with the one or more of the plurality of control applications.

5. The non-transitory computer-readable medium of claim 1, wherein the steps further include
utilizing an output of any of the plurality of functions of the context specific control application as an input into the another one or more of the plurality of control applications.

6. The non-transitory computer-readable medium of claim 1, wherein the plurality of control applications are interconnected to one another via at least a branch and a merge between intermediate functions.

7. The non-transitory computer-readable medium of claim 1, wherein the specific protocol is Border Gateway Protocol.

8. A non-transitory computer-readable medium having instructions stored thereon for programming a device for performing steps of:
receiving information from a governed system having resources, wherein the governed system is a network;
implementing a plurality of context specific control applications that each is a pipeline of a plurality of functions to control the resources and with specified interfaces to other context specific control applications, wherein each context specific control application of the plurality of context specific control applications is configured to control functional behavior of a corresponding aspect of the network, wherein a context specific control application of the plurality of context specific control applications controls one of functional behavior of (i) a network slice, (ii) a specific protocol, (iii) an Operations, Administration, and Management (OAM) function, and (iv) resources associated with the network slice, wherein the plurality of functions include sensing, discerning, inferring, deciding, and causing the actions;
utilizing the information as one input to a first function in the plurality of functions of a context specific control application;
utilizing inputs from another one or more of the plurality of context specific control applications as inputs to any of the plurality of functions of the context specific control application;
causing actions on the resources based on outputs of a last function in the plurality of functions of the context specific control application; and
dynamically modifying weights on inputs between any of the plurality of functions for the discerning.

9. The non-transitory computer-readable medium of claim 8, wherein the steps further include
dynamically modifying what information is used as the one input to the sensing.

10. The non-transitory computer-readable medium of claim 8, wherein the steps further include
dynamically selecting one or more infer engines of a plurality of infer engines.

11. The non-transitory computer-readable medium of claim 8, wherein the steps further include
sharing the sensing with the one or more of the plurality of control applications.

12. The non-transitory computer-readable medium of claim 8, wherein the steps further include
utilizing an output of any of the plurality of functions of the context specific control application as an input into the another one or more of the plurality of control applications.

13. The non-transitory computer-readable medium of claim 8, wherein the plurality of control applications are interconnected to one another via at least a branch and a merge between intermediate functions.

14. The non-transitory computer-readable medium of claim 8, wherein the specific protocol is Border Gateway Protocol.

15. A non-transitory computer-readable medium having instructions stored thereon for programming a device for performing steps of:
receiving information from a governed system having resources, wherein the governed system is a network;
implementing a plurality of context specific control applications that each is a pipeline of a plurality of functions to control the resources and with specified interfaces to other context specific control applications, wherein each context specific control application of the plurality of context specific control applications is configured to control functional behavior of a corresponding aspect of the network, wherein a context specific control application of the plurality of context specific control applications controls one of functional behavior of (i) a network slice, (ii) a specific protocol, (iii) an Operations, Administration, and Management (OAM) function, and (iv) resources associated with the network slice, wherein the plurality of functions include sensing, discerning, inferring, deciding, and causing the actions;
utilizing the information as one input to a first function in the plurality of functions of a context specific control application;
utilizing inputs from another one or more of the plurality of context specific control applications as inputs to any of the plurality of functions of the context specific control application;
causing actions on the resources based on outputs of a last function in the plurality of functions of the context specific control application; and
dynamically selecting one or more infer engines of a plurality of infer engines.

16. The non-transitory computer-readable medium of claim 15, wherein the steps further include
dynamically modifying what information is used as the one input to the sensing.

17. The non-transitory computer-readable medium of claim 15, wherein the steps further include
dynamically modifying weights on inputs between any of the plurality of functions for the discerning.

18. The non-transitory computer-readable medium of claim 15, wherein the steps further include
sharing the sensing with the one or more of the plurality of control applications.

19. The non-transitory computer-readable medium of claim 15, wherein the steps further include
  utilizing an output of any of the plurality of functions of the context specific control application as an input into the another one or more of the plurality of control applications.

20. The non-transitory computer-readable medium of claim 15, wherein the specific protocol is Border Gateway Protocol.

\* \* \* \* \*